United States Patent
Mori et al.

(10) Patent No.: US 7,971,678 B2
(45) Date of Patent: Jul. 5, 2011

(54) VEHICLE STEERING DEVICE AND CONTROL METHOD FOR VEHICLE STEERING DEVICE

(75) Inventors: Kenichi Mori, Sagamihara (JP); Junji Tsutsumi, Fujisawa (JP); Toshiaki Kasahara, Kanagawa (JP); Yuusuke Katou, Kawasaki (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 660 days.

(21) Appl. No.: 11/972,834

(22) Filed: Jan. 11, 2008

(65) Prior Publication Data
US 2008/0185213 A1    Aug. 7, 2008

(30) Foreign Application Priority Data
Feb. 5, 2007    (JP) ................................ 2007-025064

(51) Int. Cl.
B62D 6/00 (2006.01)
B62D 5/00 (2006.01)
(52) U.S. Cl. .......................................... 180/402; 701/42
(58) Field of Classification Search .................. 180/402; 701/42
See application file for complete search history.

(56) References Cited

U.S. PATENT DOCUMENTS

| 2005/0205336 | A1* | 9/2005 | Yamasaki et al. | 180/402 |
| 2006/0190151 | A1* | 8/2006 | Tsutsumi et al. | 701/41 |
| 2006/0200289 | A1* | 9/2006 | Chino et al. | 701/41 |
| 2007/0137921 | A1* | 6/2007 | Kasahara | 180/405 |
| 2008/0249685 | A1* | 10/2008 | Hara et al. | 701/42 |

FOREIGN PATENT DOCUMENTS

| JP | 2005-008073 | 1/2005 |
| JP | 2005-008073 A | 1/2005 |
| JP | 2005-262969 | 9/2005 |
| JP | 2006-001417 | 1/2006 |
| WO | 2006/064343 A2 | 6/2006 |

* cited by examiner

*Primary Examiner* — Tony H. Winner
*Assistant Examiner* — Jacob Knutson
(74) *Attorney, Agent, or Firm* — Young Basile

(57) ABSTRACT

In a vehicle steering device and control method, a selectively engageable clutch is positioned between a steering wheel and a turning mechanism for turning at least one wheel. The clutch has an engaged position where the steering wheel is mechanically connected to the turning mechanism and a disengaged position where the steering wheel is mechanically separated from the turning mechanism for steer-by-wire control. During steer-by-wire control, a reaction force actuator applies a force to the steering wheel, and a turning actuator applies a torque to the turning mechanism. To prevent erroneous clutch engagement caused by an increase in relative angular acceleration between the steering angle and the turning angle, a controller detects an operating condition corresponding to a risk of erroneous clutch engagement and controls at least one of the turning actuator and the reaction force actuator to reduce the relative angular acceleration.

18 Claims, 11 Drawing Sheets

VEHICLE STEERING DEVICE AND CONTROL METHOD FOR VEHICLE STEERING DEVICE

CROSS-REFERENCE TO RELATED APPLICATION

This application claims priority from Japanese Patent Application Serial No. 2007-025064, filed Feb. 5, 2007, which is incorporated herein in its entirety by reference.

TECHNICAL FIELD

The invention pertains to the field of vehicle steering devices, and more particularly, the invention pertains to a steer-by-wire vehicle steering device having a clutch operable to selectively couple a vehicle wheel turning mechanism and a steering wheel.

BACKGROUND

Steer-by-wire steering systems are known. Generally stated, steer-by-wire steering systems are steering devices wherein the steering wheel is not mechanically connected to the steered wheels of the vehicle. Instead, steer-by-wire steering systems allow remote operation of a motorized turning mechanism according to the angle of rotation, or steering angle, of a steering wheel. Furthermore, there are known steer-by-wire steering systems that allow for direct mechanical control of the turning mechanism in the event of electrical system problems. For example, Japanese Kokai Patent Publication No. 2005-008073 shows a steer-by-wire steering system that has a clutch that couples the rotating shaft of the vehicle wheel turning mechanism and the rotating shaft of the steering wheel, and thus, direct mechanical control of the turning mechanism using the steering wheel is made possible.

BRIEF SUMMARY

Embodiments of a vehicle steering device and control methods for a vehicle steering device are taught herein. One device includes, for example, a steering wheel operable by a driver and having a steering wheel shaft connected thereto. A turning mechanism is operable to turn at least one steered wheel, and a turning actuator is operable to apply torque to the turning mechanism. A reaction force actuator is connected to the steering wheel to apply a steering reaction force thereto, and a selectively engageable clutch is positioned between the steering wheel and the turning mechanism. The clutch has a first rotary member mechanically connected to the turning mechanism, a second rotary member mechanically connected to the steering wheel shaft, and an engaging piece interposed between the first rotary member and the second rotary member. The clutch has an engaged position when the engaging piece is in wedging engagement between the first rotary member and the second rotary member, wherein the steering wheel shaft is mechanically connected to the turning mechanism for turning the at least one steered wheel, and the clutch has a disengaged position when the engaging piece is in an intermediate position between the first rotary member and the second rotary member, wherein the steering wheel shaft is mechanically separated from the turning mechanism for steer-by-wire control of the at least one steered wheel. A steering control part is configured to control the turning actuator according to a steering angle of the steering wheel when the clutch is in the disengaged position such that a turning angle of the at least one steered wheel corresponds to the steering angle of the steering wheel and to simultaneously control the reaction force actuator to apply a steering reaction force to the steering wheel. The steering control part is further configured to prevent the clutch from moving to the engaged position in response to a detection of an operating condition by controlling at least one of the turning actuator and the reaction force actuator to reduce a relative angular acceleration between the steering wheel and the turning mechanism.

Variations in this embodiment and other embodiments are described in additional detail herein.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

In known steer-by-wire steering systems, a clutch is used that mechanically connects the steering wheel to the vehicle wheel turning mechanism by engaging the rotating shaft of the vehicle wheel turning mechanism to the rotating shaft of the steering wheel by means of an engagement member, or engaging piece. However, when the change of the steering wheel steering angle is rapid while the change of the steered wheels turning angle is slow, the relative angular acceleration between the steering angle and the turning angle increases, so that the engagement member may engage, causing erroneous engagement of the clutch. If steer-by-wire control continues after erroneous engagement of the clutch by continued actuation of the vehicle wheel turning mechanism in response to the steering angle, torque contrary to the driver's expectation may be applied to the steering wheel by the turning mechanism, thereby creating driver discomfort.

Exemplary embodiments of the invention described in detail hereinafter with reference to the drawings minimize this risk.

Figure 1:
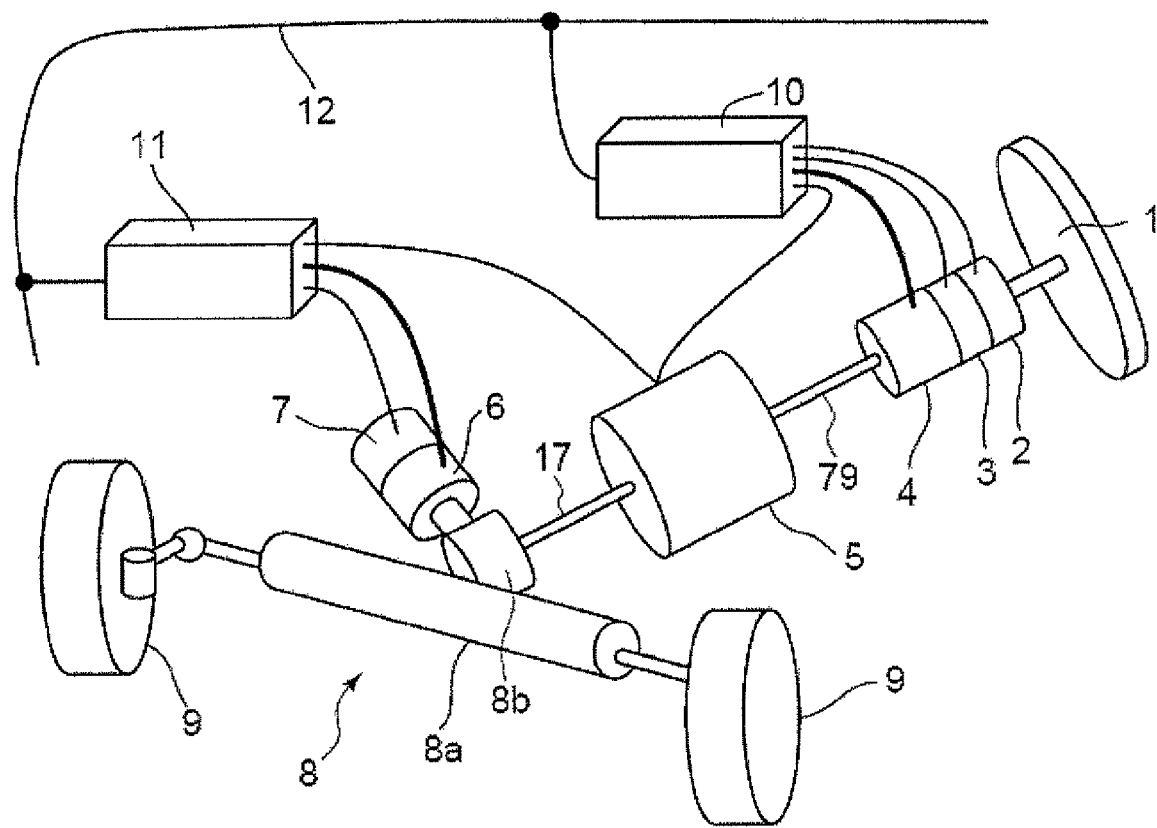
FIG. 1 is an illustration showing a steer-by-wire system.

As shown in FIG. 1, a vehicle steering device or steer-by-wire system (hereinafter to be referred to as a SBW system) in which embodiments of the invention can be incorporated has a steering wheel 1 that can be operated (steered) by the driver, and a steering wheel shaft 79, which is the rotational shaft of steering wheel 1 and is connected to steering wheel 1. Steering angle sensor 2 detects the steering angle, and torque sensor 3 detects the steering torque of the steering wheel 1. A reaction force motor 4 (reaction force actuator) applies a reaction force to the steering wheel 1. The SBW system also includes a backup clutch 5 (hereinafter to be referred to as clutch). A turning mechanism 8 is composed of rack 8a connected to steered wheels 9 and pinion 8b connected to the rack 8a by a gear mechanism. Pinion shaft 17 acts as the rotational shaft of pinion 8b. Turning motor, or actuator, 6 is connected to the pinion shaft 17 by a gear mechanism and drives steered wheels 9 to turn by applying a turning torque to the turning mechanism. A turning angle sensor 7 detects the rotational angle of turning motor 6 (that is, the turning angle).

Also included in the SBW system are a reaction force controller 10, a turning controller 11 and communication line 12 between them. Each of the controllers 10, 11 is here implemented by, for example, a respective microcomputer including a random access memory (RAM), a read-only memory (ROM) and a central processing unit (CPU) in addition to various input and output connections. Generally, the control functions described herein and associated with each of the parts are performed by execution by the CPU of one or more software programs stored in ROM. Of course, some or all of the parts and their associated functions can be implemented by hardware components. While two controllers 10, 11 are shown, only one or more than two are also possible.

With regard to the detected value of torque sensor 3, the torque in one direction of rotation with respect to steering wheel 1 is detected as a positive value, while the torque in the other direction is detected as a negative value.

The SBW system normally operates with no mechanical connection between steering wheel 1 and steered wheels 9 as well as turning mechanism 8. However, clutch 5 is operable to selectively couple and separate steering wheel shaft 79 and pinion shaft 17. Thus, a mechanical connection can be made between steering wheel 1 and turning mechanism 8. In case of any malfunction in the SBW system, clutch 5 can be engaged to allow the driver to steer the steered wheels 9 mechanically, by engaging clutch 5 to connect steering wheel shaft 79 and pinion shaft 17.

Figure 10:
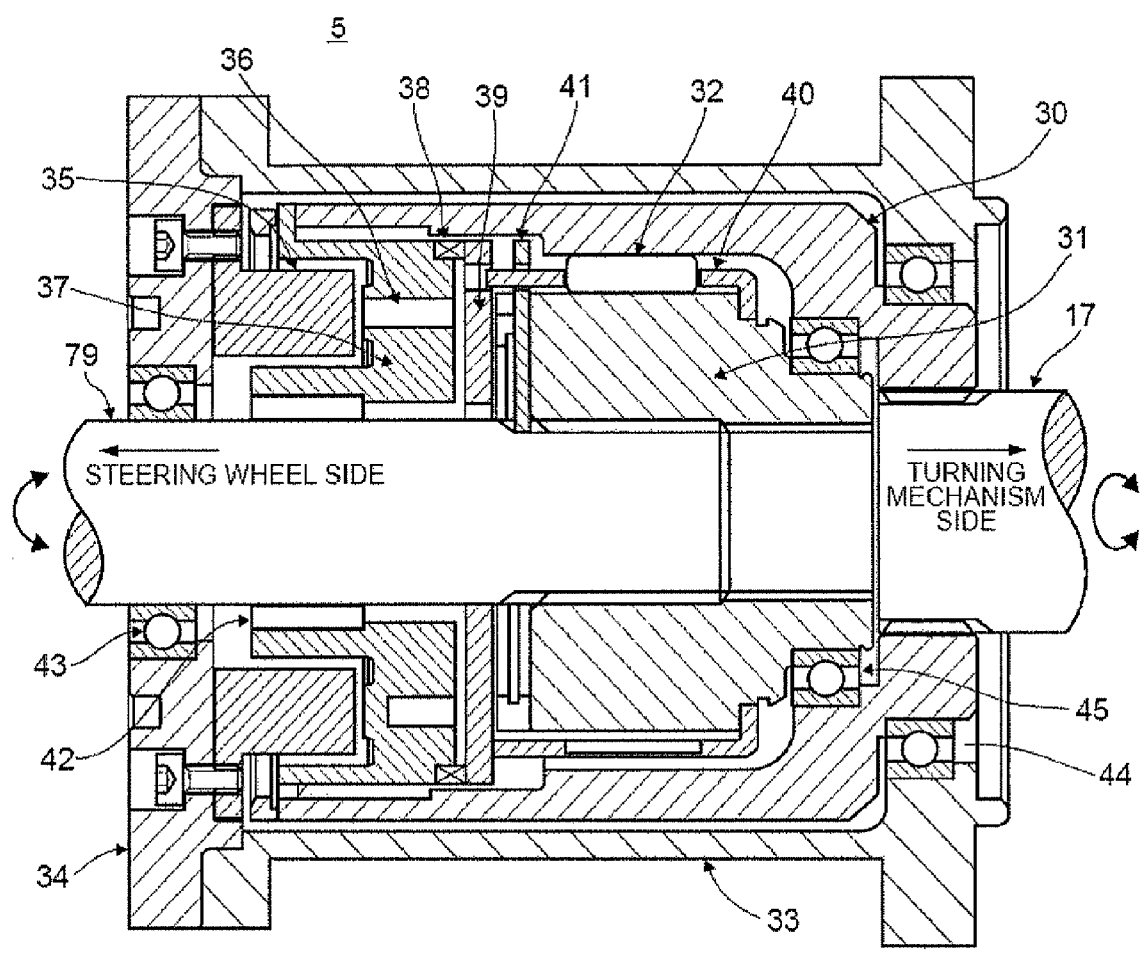
FIG. 10 is a cross section showing a clutch.

As shown in FIG. 10, clutch 5 is a bidirectional clutch that engages the pinion shaft 17 of turning mechanism 8 and the steering wheel shaft 79 of steering wheel 1 by means of rollers 32 (also called engagement members). Because the mechanism of this bidirectional clutch is known, only a brief description is given on the mechanism of clutch 5.

Clutch 5 has a first rotary member, namely an outer ring 30, a second rotary member, namely an inner ring 31, a magnetizing part that generates a magnetic force for clutch connection and disconnection, and a mechanical clutch part that connects and disconnects the outer ring 30 and the inner ring 31. The rotary member having a mechanical clutch part is connected to the steering wheel shaft 79 connected to steering wheel 1 or to pinion shaft 17 of turning mechanism 8, whichever has the smaller change in rotational angle.

Inner ring 31 of clutch 5 is connected to steering wheel shaft 79, for example, and pinion shaft 17 of turning mechanism 8 is connected to the outer ring 30. In particular, the steering wheel shaft 79 and the pinion shaft 17 engage one another via complementary engaging serrations, and likewise, the pinion shaft 17 and the outer ring 30 engage one another via complementary engaging serrations.

Figure 11:
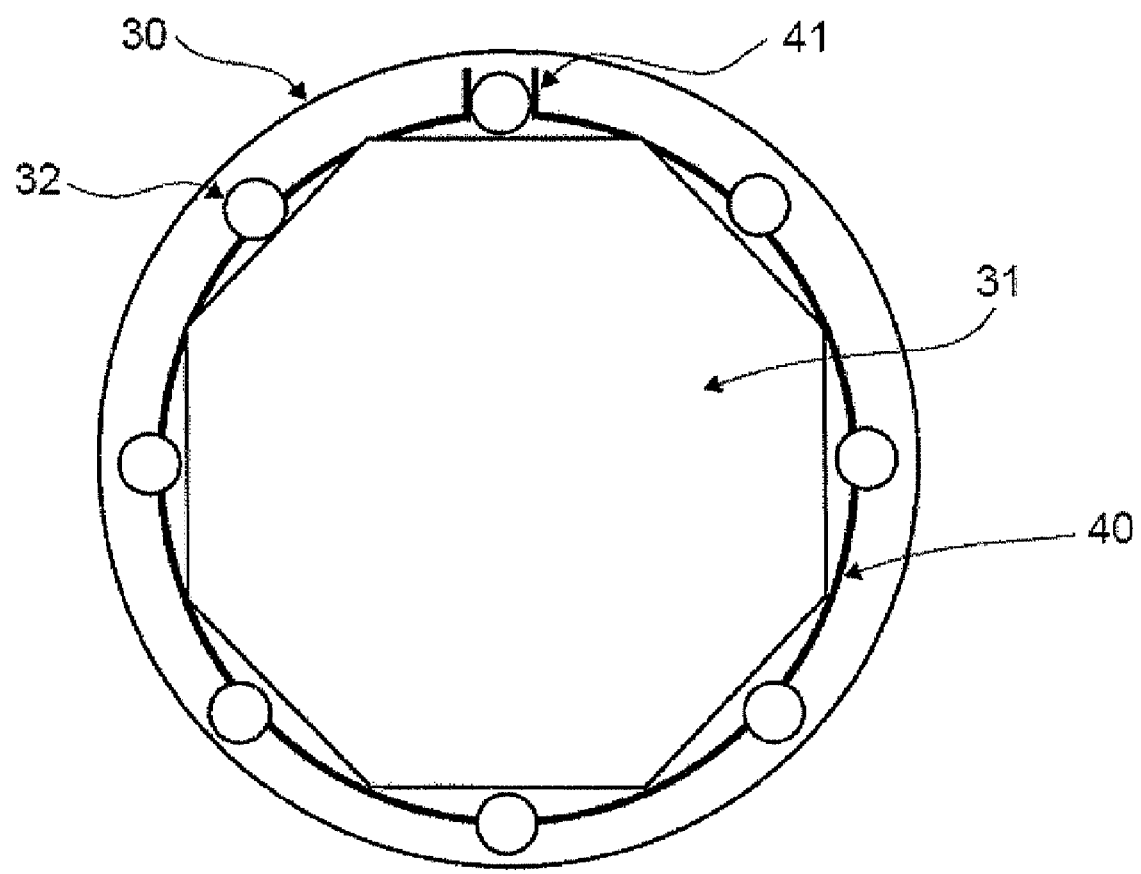
FIG. 11 is an illustration showing the mechanical clutch portion of the clutch.

As shown in FIG. 11, outer ring 30 has a cylindrical inner peripheral surface. The inner ring 31 is seated within the outer ring 30 and has an outer peripheral surface with a cam shape (octagonal shape). The clutch 5 also has a plurality of rollers 32 (engagement members) that are interposed between the outer ring 30 and the inner ring 31.

Clutch 5 moves between a released state, wherein the steering wheel shaft 79 is not mechanically coupled to the pinion shaft 17, and an engaged state, wherein the steering wheel shaft 79 is mechanically coupled to the pinion shaft 17. In the released state, the rollers 32 are held in an intermediate position with respect to the inner ring 31 by a magnetic excitation part, magnetizing part, thereby allowing the outer ring 30 to rotate freely with respect to the inner ring 31. In the engaged state, the rollers 32 are not held in the intermediate position by the magnetizing part, and the rollers 32 become wedged between the outer ring 30 and the inner ring 31, thus causing the outer ring 30 and the inner ring 31 to rotate in unison with one another.

The magnetizing part, as shown in FIG. 10, includes an electromagnetic coil 35 that is affixed to an end plate 34 (also called a clutch case member) of a clutch case 33, a rotor 37 that engages the outer ring outer ring 30 via serrations, and a permanent magnet 36 arranged inside the field of the electromagnetic coil 35. Here, since the permanent magnet 36 is arranged inside the field of electromagnetic coil 35, the electromagnetic coil 35 is operable to impart magnetic flux of the same or opposite phase to the magnetic flux generated by the permanent magnet 36.

As seen in FIG. 10, the clutch 5 includes an armature 39 arranged to be movable in the axial direction relative to the rotor 37 via a separating spring 38. The rollers 32 (eight shown by example) serve as multiple engaging pieces interposed between the outer ring 30 and the inner ring 31 and are fitted into pockets of a retainer, or holder, 40 to maintain the established equidistant spacing of the plurality of rollers 32. Here, the holder 40 is supported to be rotatable with respect to the inner ring 31.

As shown in FIG. 11, a neutral spring 41 holds one roller 32 at the neutral position when the clutch is released. The neutral spring 41 applies a spring force returning rollers 32 wedge-engaged between outer ring 30 and inner ring 31 to the neutral position. Here, neutral spring 41 is fixed on inner ring 31. A needle bearing 42 is furnished between the steering wheel shaft 79 and the rotor 37.

Referring again to FIG. 10, steering wheel shaft 79 is supported on end plate 34 by a first ball bearing 43. Outer ring 30 is supported on clutch case 33 by a second ball bearing 44. A third ball bearing 45 is included between outer ring 30 and inner ring 31.

In the SBW system according to the first embodiment, clutch 5 is in the released state during normal operation, and turning mechanism 8 is driven to perform SBW control according to the steering angle of steering wheel 1. However, in case of a malfunction in the SBW system, clutch 5 engages, and electric power steering (EPS) control is performed using turning motor 6 to add an auxiliary steering force to the steering applied by the driver from steering wheel 1.

During SBW control, the steering angle of the steering wheel 1 is detected by the steering angle sensor 2, and the instructed turning angle, which is the instructed value for converting the steering angle into the turning angle as the target rotational angle of turning motor 6, is computed by the reaction force controller 10. Turning controller 11 computes the instructed driving value for turning motor 6 such that the actual turning angle (the actual rotational angle of turning motor 6 detected by turning angle sensor 7, also referred to as the actual steering angle) matches the instructed turning angle, and the turning motor 6 drives turning mechanism 8 to turn the steered wheels 9 in response to the instructed driving value.

In this SBW control, reaction force motor 4 applies a reaction force to the steering wheel 1 based on the instructed driving value computed by reaction force controller 10. The instructed driving value of reaction force motor 4 is computed based on the electric current value (driving current) of turning motor 6, which corresponds to the turning load (the load applied to the steered wheels by resistance to the turning operation), the vehicle speed, and other related factors. Here, as another scheme, the instructed driving value of reaction force motor 4 also can be computed based on the axial force detected by an axial force sensor disposed on rack 8a for detecting the axial force (or turning load) applied to rack 8a. In order to simulate the reaction force of the road surface, the instructed driving value of the reaction force motor 4 is set such that its value increases as the electric current value for turning motor 6 (that is, the turning load) becomes larger. In addition, in order to simulate the turning load at the rack end when steered wheels 9 reach the maximum turning angle or when steered wheels 9 hit the road curb, the instructed driving value of the reaction force motor 4 may be set at an especially large value in such cases. In order to guarantee stability during high speed travel, the instructed driving value of the reaction force motor 4 may be set such that the value is larger as the vehicle speed becomes higher.

The instructed driving values computed by reaction force controller 10 and turning controller 11 are output to reaction force motor 4 and turning motor 6, respectively, as instructed electric current values.

Figure 2:
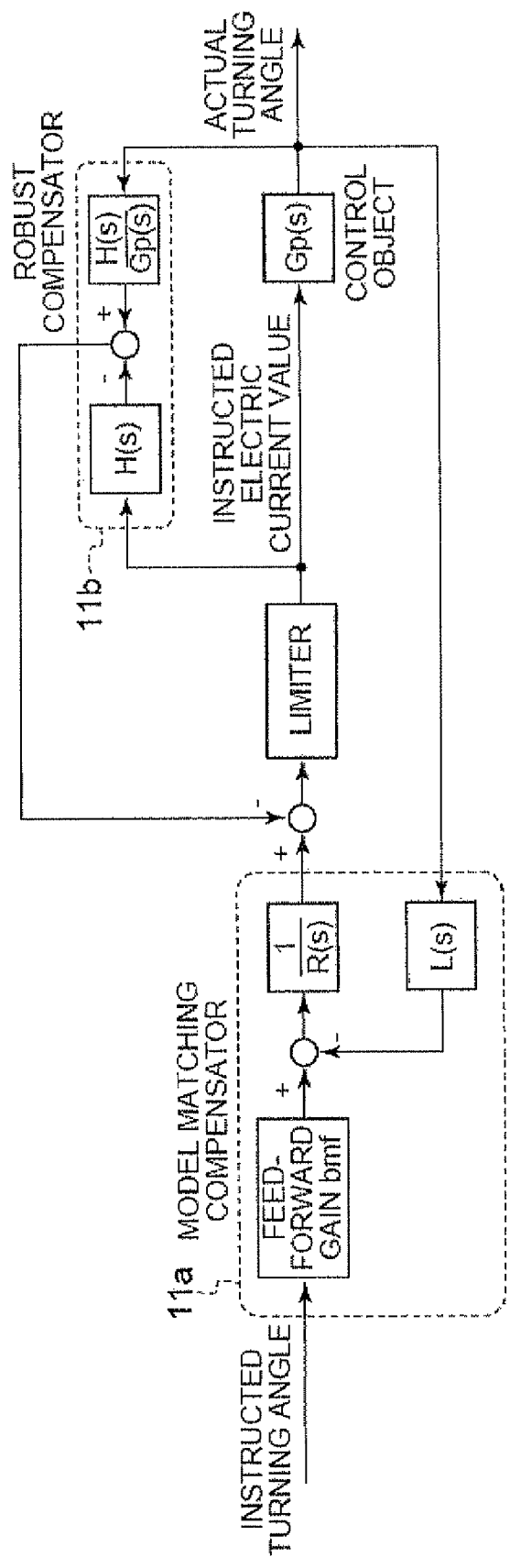
FIG. 2 is a block diagram of a turning angle control system of the steer-by-wire system.

The instructed driving value computed by turning controller 11 is calculated by a turning angle servo system such that the actual turning angle will track the instructed turning angle with prescribed response characteristics. For example, the angle servo system may be formed using the robust model matching method shown in FIG. 2. With this method, the instructed electric current value for realizing the prescribed nominal response characteristics with respect to the instructed turning angle is computed by means of model matching compensator 11a, and the compensation current corresponding to the external disturbance component is computed by means of robust compensator 11b. Thus, the turning angle servo system is able to resist external disturbances so that the actual turning angle can exhibit standard response characteristics even when external disturbances occur.

Reaction force controller 10 according to the first embodiment prevents clutch 5 from erroneously engaging when the relative angular acceleration between the rotating shaft of the steering wheel and the engaging piece of the turning mechanism becomes large. For example, assuming that the driver lifts his/her hands from steering wheel 1 when the turning actuator reaches the maximum turning angle and the steering reaction force is large, it is judged that the relative angular acceleration between the steering angle and the turning angle has become high. Control for preventing erroneous clutch engagement (also known as control for reducing relative angular acceleration) is executed. With this control, turning motor 6 is controlled so that the variation in the turning angle with respect to change in the steering angle becomes greater, and there is a return to normal SBW control when the turning load becomes sufficiently low, and there is less likelihood of an increase in the relative angular acceleration between the steering angle and the turning angle.

Figure 3:
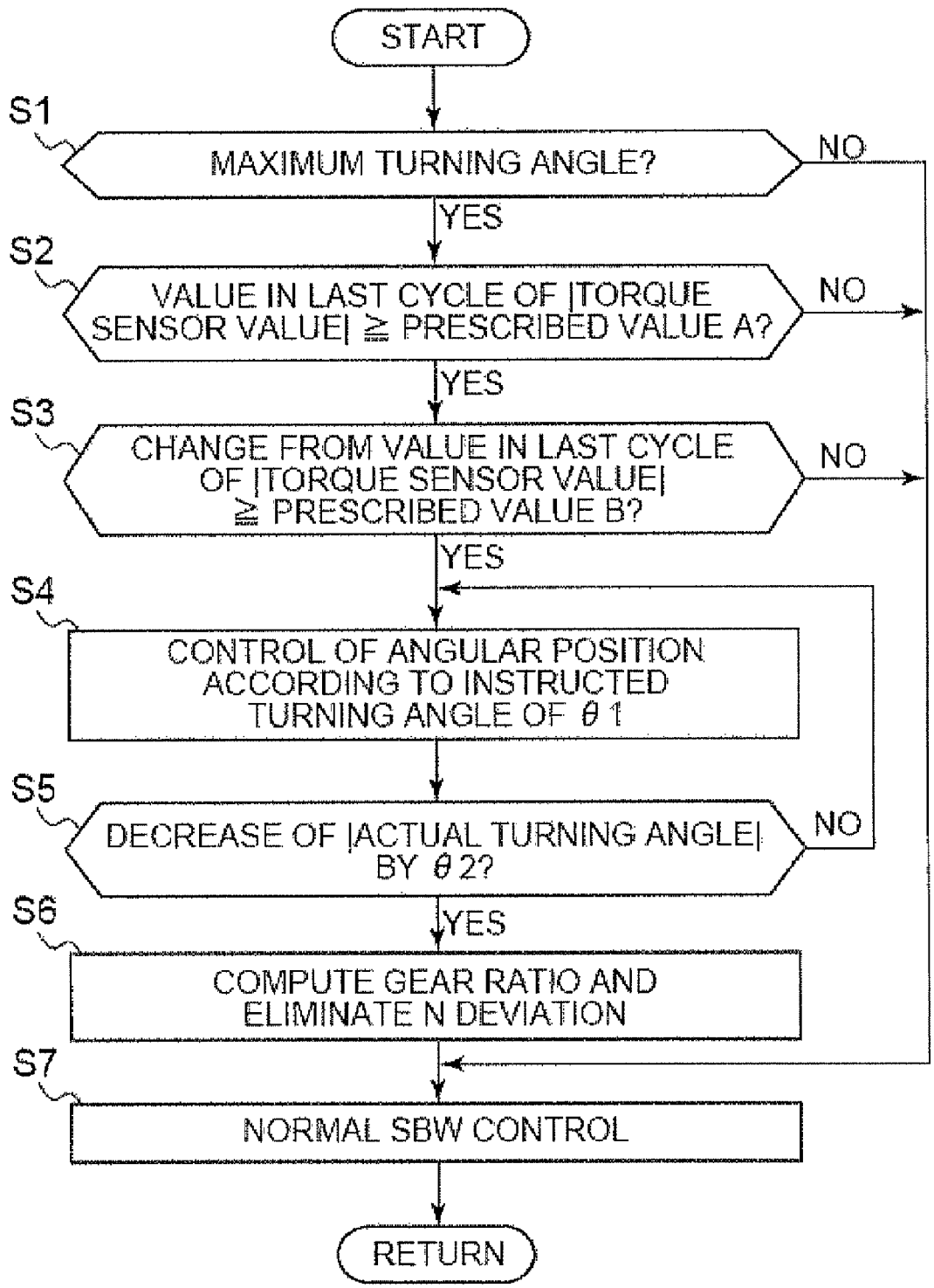
FIG. 3 is a flow chart showing the control processing for preventing erroneous clutch engagement executed by a reaction force controller in a first embodiment.

Process steps executed by reaction force controller 10 during the control for preventing erroneous engagement of clutch 5 according to the first embodiment are explained with reference to FIG. 3. Control processing is executed in individual control computing periods (for example, every 5 msec).

At step S1 a judgment is made on whether the turning angle detected by turning angle sensor 7 is equal to a maximum turning angle. If step S1 evaluates as YES, flow proceeds to step S2. If step S2 evaluates as NO, flow proceeds to step S7. Here, the maximum turning angle refers to the maximum value of the turning angle that can be realized by steered wheels 9 and is a prescribed angle for each given vehicle.

At step S2 a judgment is made on whether the absolute value of the previous torque value detected by torque sensor 3 meets or exceeds prescribed value A (for example, 5 Nm), wherein the prescribed value A corresponds to a steering reaction force that may lead to erroneous clutch engagement when the driver lifts his/her hands from the steering wheel. If step S2 evaluates as YES, flow proceeds to step S3. If step S2 evaluates as NO, flow proceeds to step S7. As an alternative, it should also be understood that the determination made in step S2 could also be made by checking whether the absolute value of the previous electric current value for reaction force motor 4 meets or exceeds a prescribed value (for example, 50 A), with equivalent results.

As another alternative, it should be understood that the determination of step S2 could be performed by check whether the turning load exceeds a prescribed turning load that corresponds to generation of a reaction force torque by the reaction force actuator 4 that may lead to erroneous clutch engagement, with equivalent results. In this case, a judgment is made on whether the absolute value of the previous electric current value for turning motor 6, which corresponds to the turning load, meets or exceeds the electric current value corresponding to a prescribed value A' (for example, a reaction force torque of about 5 Nm).

In step S3, a judgment is made on whether the driver has lifted his/her hands from steering wheel 1. Step S3 may be performed by checking whether the absolute value of the change in the torque value detected by torque sensor 3 with respect to the previous control computing period meets or exceeds a prescribed value B (for example, 2 Nm). If step S3 evaluates as YES, flow proceeds to step S4. If step S3 evaluates as NO, flow proceeds to step S7. As an alternative, step S3 may be performed by computing the angular acceleration for the turning angle and the steering angle and checking whether the difference in angular acceleration meets or exceeds a prescribed value (for example, $1 \times 10^6$ deg/s), instead of using the value of torque sensor 3. That is, if the driver lifts his/her hands from steering wheel 1 when the reaction force torque is large, the steering wheel will rotate excessively, so that the angular acceleration for the steering angle increases excessively, and the difference from the angular acceleration for the turning angle becomes greater. Consequently, if the difference in the angular acceleration exceeds a prescribed value, it may be judged that the driver has lifted his/her hands from steering wheel 1.

In step S4 the instructed turning angle is decreased to a prescribed value θ1 (such as 450 deg when the maximum turning angle is set at 460 deg). As an alternative step S4 may be performed by reducing the steering gear ratio (the ratio of the turning angle to the steering angle), instead of changing the instructed turning angle. For example, assuming the ratio of the turning angle to the steering angle in the normal state is equal to 1, by reducing the steering gear ratio to 0.9, the resulting instructed turning angle is reduced. Thus, the change in the turning angle can be made larger than the change in the steering angle.

In step S5 a judgment is made on whether steered wheels 9 have turned back by checking whether the turning angle has changed (decreased) from the maximum turning angle by a prescribed value θ2 (for example, 10 deg). If step S5 evaluates as YES, flow proceeds to step S6. If step S5 evaluates as NO, flow proceeds to step S4. As an alternative, step S5 may be performed by checking whether a prescribed time (for example, 50 ms) has elapsed since the control of step S4 was initiated, instead of checking the change in turning angle.

In step S6, in order to correct any deviation from the neutral position (hereinafter to be referred to as the N deviation) of the steering wheel as a result of the processing of step S4, for example, the steering gear ratio (the ratio of the turning angle to the steering angle) is re-computed, and control is performed to eliminate the N deviation. Process flow then proceeds to step S7.

In step S7 the SBW system returns to normal SBW control, and the process flow goes to RETURN.

In the SBW system in the first embodiment, even in the event of erroneous clutch engagement 5 during SBW control, normal SBW control is continued by means of reaction force controller 10 and turning controller 11. That is, the instructed turning angle is computed by reaction force controller 10 based on the steering angle, and angle control is performed by turning controller 11 so that the actual turning angle follows the instructed turning angle according to the prescribed response characteristics (nominal response).

Figure 4:
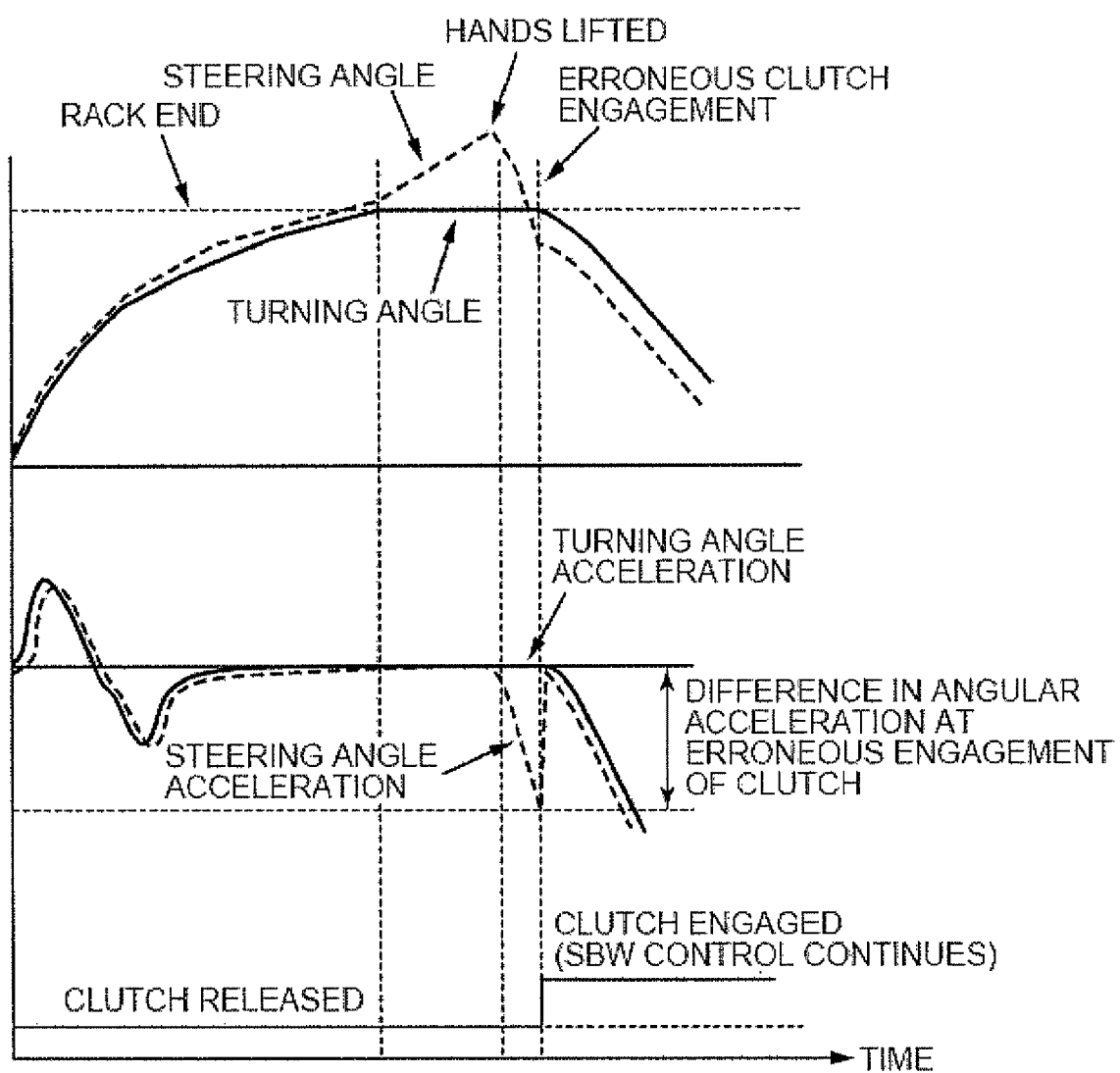
FIG. 4 is a time chart illustrating erroneous clutch engagement caused by an increase in the relative angular acceleration between the steering angle and the turning angle in previous steer-by-wire systems.

Consequently, for example, as shown in FIG. 4, when the steered wheels reach the maximum turning angle, such as at the end of the rack, the actual turning angle is limited, the torque output from reaction force motor 4 rises if steering wheel 1 is turned further. If the driver lifts his/her hands from steering wheel 1 in this situation, the steering wheel 1 rotates excessively in the turning-back direction, but the actual turning angle is at the maximum turning angle as it is. As a result, the difference between the acceleration for the turning angle and the acceleration for the steering angle (the relative angular acceleration between the turning angle and the steering angle) increases, and steering wheel 1 and turning mechanism 8 may be unintentionally connected to each other by clutch 5.

When this occurs, there is necessarily a deviation between the actual turning angle and the instructed turning angle, and thus turning controller 11 controls the instructed electric current value provided to turning motor 6 in an attempt to bring the actual turning angle into compliance with the instructed turning angle. However, since steering wheel 1 and turning mechanism 8 are connected to each other by clutch 5, turning motor 6 causes rotation of the steering wheel 1. Regardless, reaction force controller 10 continues to compute the instructed turning angle based on the steering angle, and turning controller 11 continues to control the turning motor's instructed electric current value so that the turning angle is increased further, thereby further rotating steering wheel 1. In this way, the deviation between the instructed turning angle and the actual turning angle is not reduced, the instructed electric current value for the turning motor is increased, rotational torque continues to be applied to steering wheel 1, and the steering force of the driver may be increased.

In operation of the SBW system according to the first embodiment, the foregoing situation is avoided by controlling turning motor 6 such that the relative angular acceleration between the turning angle and the steering angle becomes smaller when the steering reaction force is large at the maximum turning angle, so that erroneous clutch engagement 5 caused by the increase in the relative angular acceleration between the turning angle and the steering angle can be prevented. Accordingly, driver discomfort due to unexpected steering torque can be avoided by preventing erroneous clutch engagement.

That is, when the steering reaction force is large at the maximum turning angle, when the driver lifts his/her hands from steering wheel 1, and when the steering reaction force applied to steering wheel 1 by reaction force motor 4 causes steering wheel 1 to rotated at a high speed, the relative angular acceleration between the steering angle and the turning angle creates a risk that the clutch 5 will be erroneously engaged. In this situation, process flow in the flow chart shown in FIG. 3 goes from step S1→step S2→step S3→step S4→step S5. During the period when the turning angle is changed by a prescribed value θ2 from the maximum turning angle, turning motor 6 is controlled in step S4 so that the turning angle decreases (the turning angle changes in the turn-back direction). Then, when it is judged in step S5 that the turning angle has changed by the prescribed value θ2 from the maximum turning angle, after the correction of the N deviation in step S6, flow proceeds to step S7, and there is a return to normal SBW control.

Here, in order to reduce the relative angular acceleration between the turning angle and the steering angle in step S4, turning motor 6 is driven such that turning is performed in the direction to reduce the turning angle (turn-back direction).

Thus, in the first embodiment, when the steering reaction force is large and the driver has lifted his/her hands from steering wheel 1, turning motor 6 is controlled to reduce the relative angular acceleration between the steering angle and the turning angle so that it is possible to prevent erroneous clutch engagement.

Figure 5:
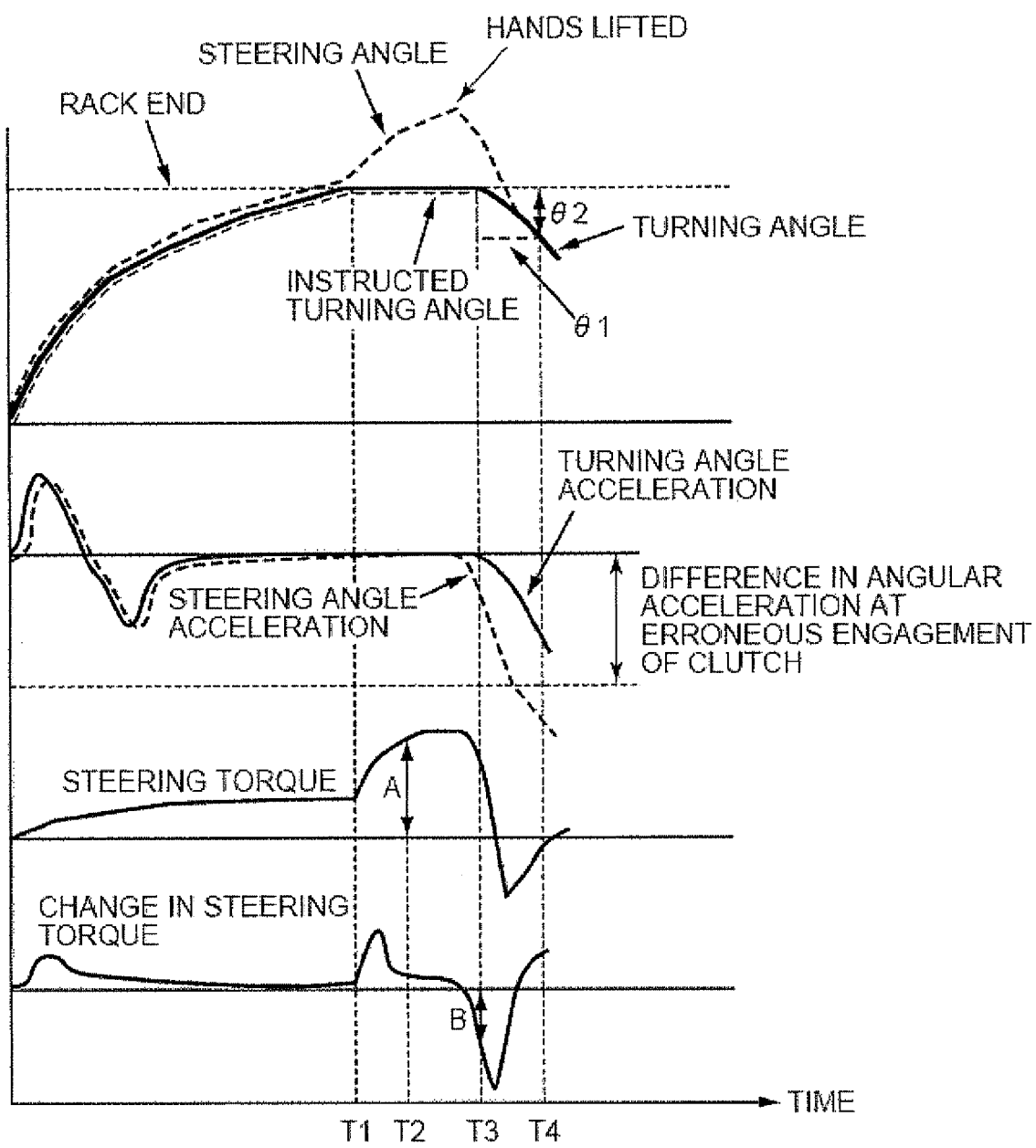
FIG. 5 is a time chart illustrating the operation for preventing erroneous clutch engagement in the first embodiment.

FIG. 5 is a time chart illustrating the operation of preventing erroneous clutch engagement in the SBW system according to the first embodiment. After time point T1 when the turning angle reaches its maximum value, the detected value of torque sensor 3 becomes larger as the driver further rotates steering wheel 1, and at time point T2 it exceeds prescribed value A. In this case, because the turning angle is limited by the maximum turning angle, it cannot exceed the maximum turning angle. When the driver lifts his/her hands from steering wheel 1 in this situation, steering wheel 1 is turned at a high speed because the steering reaction force torque is suddenly released. In the absence of the relative angular acceleration control of the SBW system according to the first embodiment, because the instructed turning angle remains at the maximum turning angle until the turning angle returns to the angle corresponding to the maximum turning angle, the turning angle is not changed, and if it is kept the same, the relative angular acceleration between the steering angle and the turning angle rises, and erroneous engagement of the clutch 5 takes place.

In contrast to this situation, when the relative angular acceleration control of the SBW system according to the first embodiment is applied, the instructed turning angle is set to the prescribed value θ1 that is smaller than the maximum turning angle when the change in the value of torque sensor 3 exceeds prescribed value B at time T3. Consequently, the turning angle moves from the maximum turning angle to the prescribed value θ1, and the acceleration of the turning angle increases. As a result, the relative angular acceleration between the steering angle and the turning angle becomes smaller, and it is thus possible to prevent erroneous engagement of the clutch 5.

At time point T4, because the turning angle is changed by prescribed value θ2 from the maximum turning angle, operation returns to normal SBW control.

In the SBW system of according to the first embodiment, as shown in FIG. 1, the parts are arranged side-by-side in the order from steering wheel 1 to torque sensor 3→reaction force motor 4→clutch 5, and the constitution is such that when the torque is released, the reaction force motor angle changes. Consequently, it is possible to judge increase in the relative angular acceleration between the steering angle and the turning angle beforehand by checking the change in the value of torque sensor 3.

From the foregoing it will be appreciated that the vehicle steering controller according to the first embodiment prevents erroneous clutch engagement when the steering reaction force exceeds a prescribed reaction force by using reaction force controller 10 to control turning motor 6 to reduce the relative angular acceleration between the steering angle and the turning angle. As a result it is possible to continue normal SBW control.

Furthermore, when reaction force controller 10 senses that the driver has lifted his/her hands from steering wheel 1, reaction force controller 10 controls turning motor 6 such that the relative angular acceleration between the steering angle and the turning angle is reduced. Consequently, it is possible to prevent erroneous clutch engagement when the driver lifts his/her hands from steering wheel at the maximum turning angle where erroneous clutch engagement is likely to take place.

In a SBW system according to a second embodiment of the invention, when the steered wheels 9 hit the road curb and the driver lifts his/her hands from steering wheel 1 after steering wheel 1 is further rotated, the current for turning motor 6 is turned off. The turning angle is changed, and the relative angular acceleration between the turning angle and the steering angle is reduced.

Figure 6:
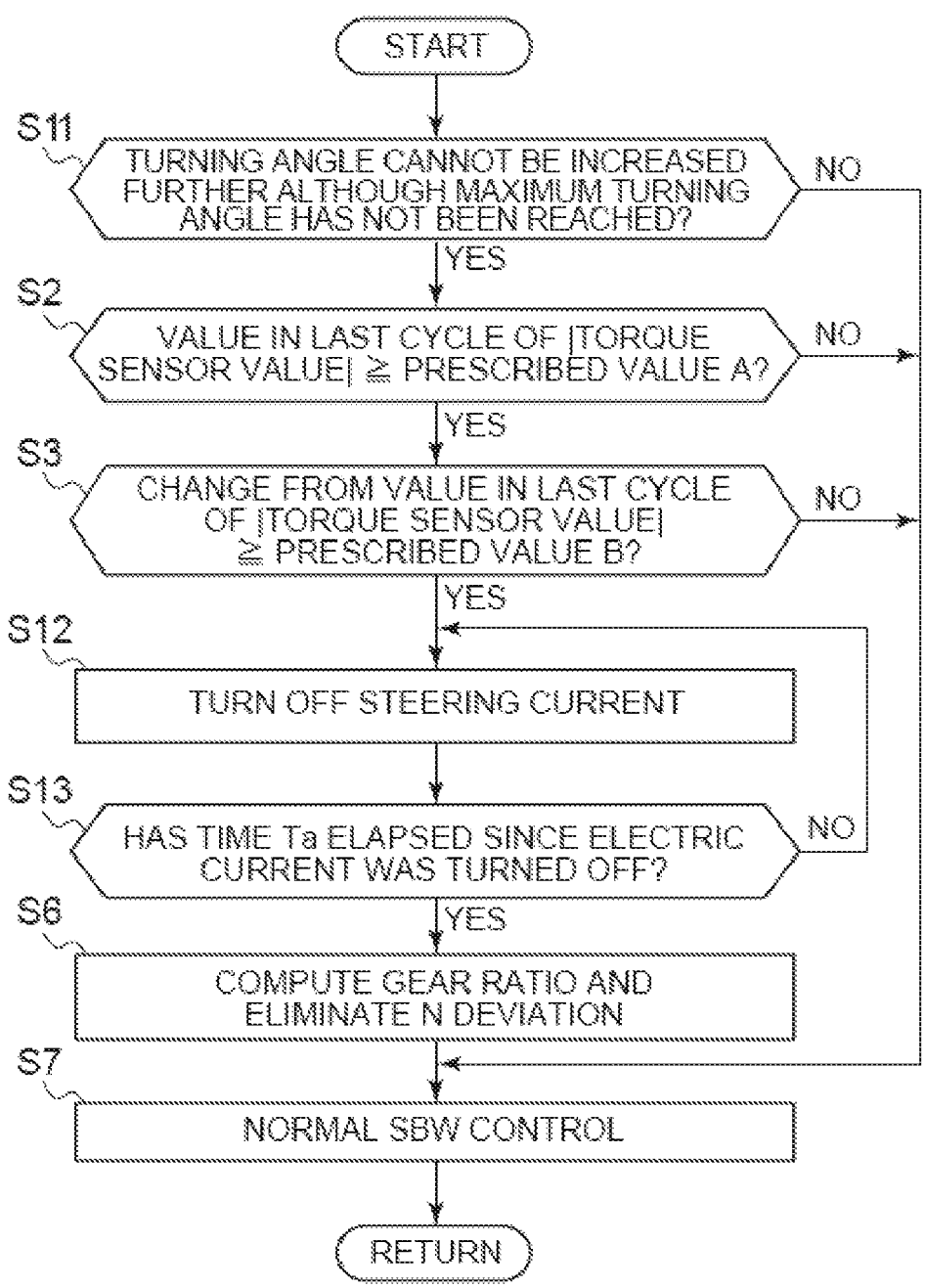
FIG. 6 is a flow chart showing the control processing for preventing erroneous clutch engagement executed by a reaction force controller in a second embodiment.

Since the hardware employed by the SBW system according to the second embodiment is substantially identical to that of the first embodiment, as described in connection with FIG. 1, the description of the second embodiment will be confined to explanation of the control processing for preventing erroneous clutch engagement executed by reaction force controller 10, as shown in FIG. 6. This process is performed for each control computing period (for example, every 5 ms). Also, the same step numbers are used for steps performing the same processing as described in connection with the first embodiment in FIG. 3, so an explanation of common steps is not repeated.

In step S11 a judgment is made on whether steered wheels 9 are hitting the road curb by checking whether the turning angle detected by turning angle sensor 7 cannot be further increased although the maximum turning angle has not been reached. That is, when the turning angle detected by turning angle sensor 7 is less than the maximum turning angle and the steering angle detected by steering angle sensor 2 is increased but the turning angle detected by turning angle sensor 7 is not increased, it is judged that steered wheels 9 are hitting a road curb or other obstacle. If step S11 evaluates as YES, flow proceeds to step S2. If step S11 evaluates as NO, flow proceeds to step S7. Here, as another scheme that can be adopted, a judgment on whether steered wheels 9 have hit a road curb or the like may also be made by checking whether the electric current value (driving current) for turning motor 6 has reached a maximum value.

If steps S2 and S3 evaluate as YES, flow proceeds to step S12, where the driving current to turning motor 6 is turned off (that is, the instructed electric current value is set at 0), and flow proceeds to step S13.

In step S13, a judgment is made on whether steered wheels 9 are turned back by checking whether a prescribed time Ta (for example, 50 ms) has elapsed since turning the driving current off. If step S13 evaluates as YES, flow proceeds to step S6. If step S13 evaluates as NO, flow proceeds to step S12. Alternatively, whether steered wheels 9 have been turned back can be determined by checking whether the turning angle detected by turning angle sensor 7 has been decreased by a prescribed value (for example, 10 deg), instead of evaluating the passage of prescribed time Ta.

That is, in the SBW system of the second embodiment, when the driver lifts his/her hands from steering wheel 1 after steered wheels 9 hit the road curb and the steering reaction force becomes large, the driving current is turned off in step S12 until the prescribed time Ta elapses. Then, the N deviation is corrected in step S6, and normal SBW control resumes in step S7.

That is, by turning off the driving current of turning motor 6, the force (that is, the torque generated by turning motor 6) working against the road surface reaction force (that is, the reaction force from the road curb or other obstacles) due to the current that has been flowing in turning motor 6 is eliminated. As a result, from the degree of distortion of the tires during static turn steering, the turning angle is returned (decreased) toward the neutral direction (straight-forward travel direction) by means of the self-aligning torque during travel. As a result, the angular acceleration of the turning angle increases, and the relative angular acceleration of the turning angle with respect to the steering angle becomes smaller. As a result, it is possible to prevent erroneous clutch engagement caused by an increase in the relative angular acceleration between the steering angle and the turning angle. Also, because it is only required that the driving current of turning motor 6 be turned off, there is no need to perform complicated operations. Instead, a simple operation can be performed.

In this embodiment, by turning off the driving current of turning motor 6 in order to set the output torque of turning motor 6 at 0, the turning angle is decreased toward the neutral direction according to the degree of distortion of the tires and the self-aligning torque. However, the invention is not limited to this specific manner of decreasing the turning angle. On the contrary, one alternative manner of decreasing the turning angle is by reducing the driving current of turning motor 6 such that the torque of turning motor 6 is decreased to the torque corresponding to a change of the turning angle to the neutral direction based on the degree of distortion of the tires and the self-aligning torque.

Figure 7:
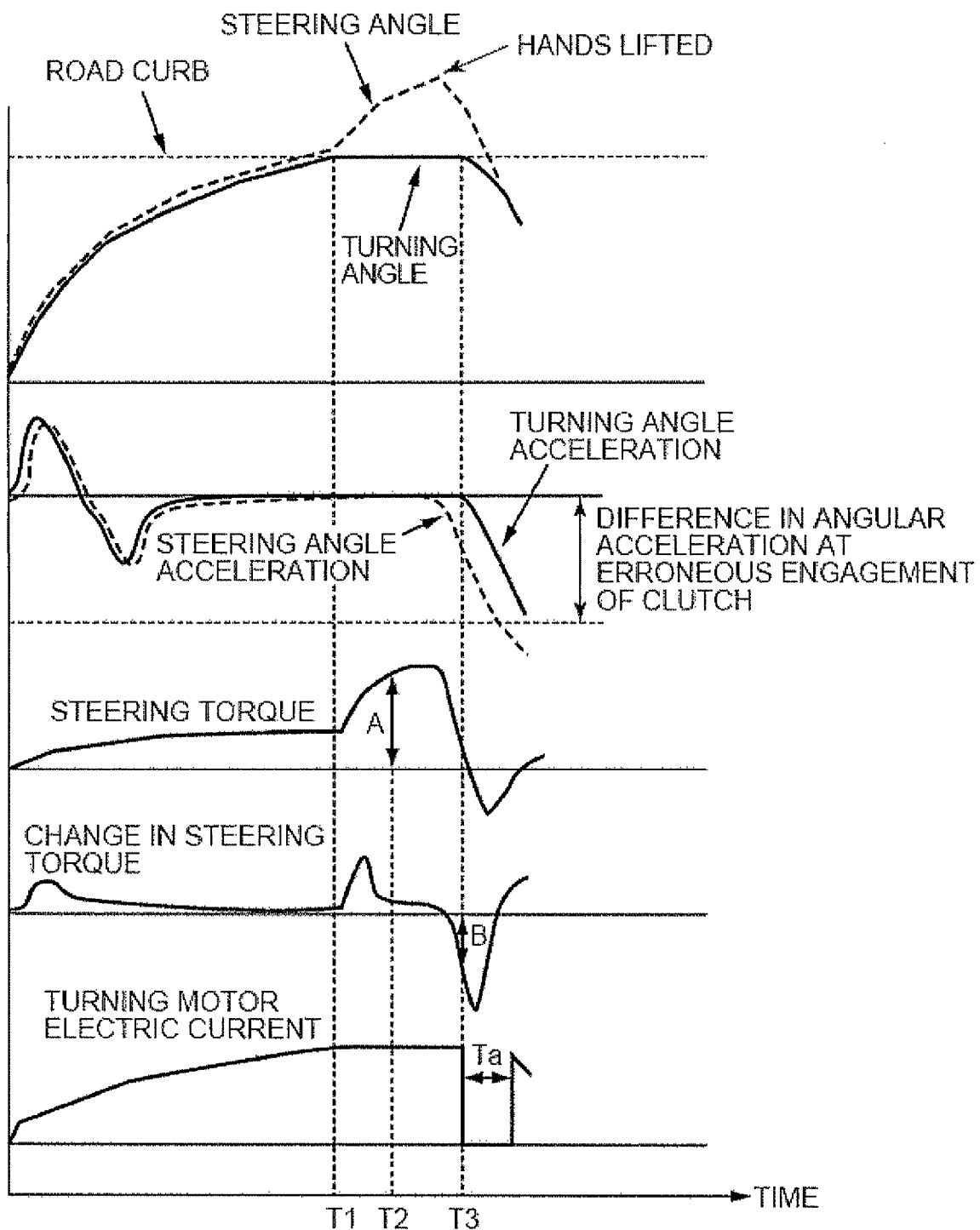
FIG. 7 is a time chart illustrating the operation for preventing erroneous clutch engagement in the second embodiment.

FIG. 7 is a time chart illustrating the operation of preventing erroneous clutch engagement in the second embodiment. After time T1, when steered wheels 9 hit the road curb, because steering wheel 1 is turned further in steering, the value of torque sensor 3 becomes larger, and it exceeds prescribed value A at time point T2. At time T3, because the change in the detected value of torque sensor 3 exceeds prescribed value B, it is judged that the driver has lifted his/her hands from steering wheel 1.

In this case, by turning off the driving current of turning motor 6, the force countering the road surface reaction force is eliminated. With only the degree of distortion of the tires during static turn steering, the turning angle moves toward the neutral position direction due to effect of the self-aligning torque during travel. As a result, the turning angle acceleration becomes larger so that the relative angular acceleration between the steering angle and the turning angle becomes smaller, and it is possible to prevent erroneous engagement of the clutch 5. Subsequently, after a prescribed time Ta has lapsed from time T3, operation returns to normal SBW control.

For the vehicle steering controller in the second embodiment, the following effects are also realized in addition to the effects realized in the first embodiment.

In the SBW system according to the second embodiment, reaction force controller 10 executes the control for preventing erroneous clutch engagement (corresponding to the control for reducing relative angular acceleration) by turning off the driving current of turning motor 6, thereby decreasing the turning torque of turning motor 6 so that there is no need to perform complicated control. In this manner, erroneous clutch engagement caused by an increase in the relative angular acceleration between the steering angle and the turning angle is prevented by a simple operation.

In an SBW system according to a third embodiment, by controlling reaction force motor 4 such that the change of the steering angle becomes slower, the acceleration of the steering angle is reduced. Thus, the relative angular acceleration of the steering angle with respect to the turning angle is decreased.

Figure 8:
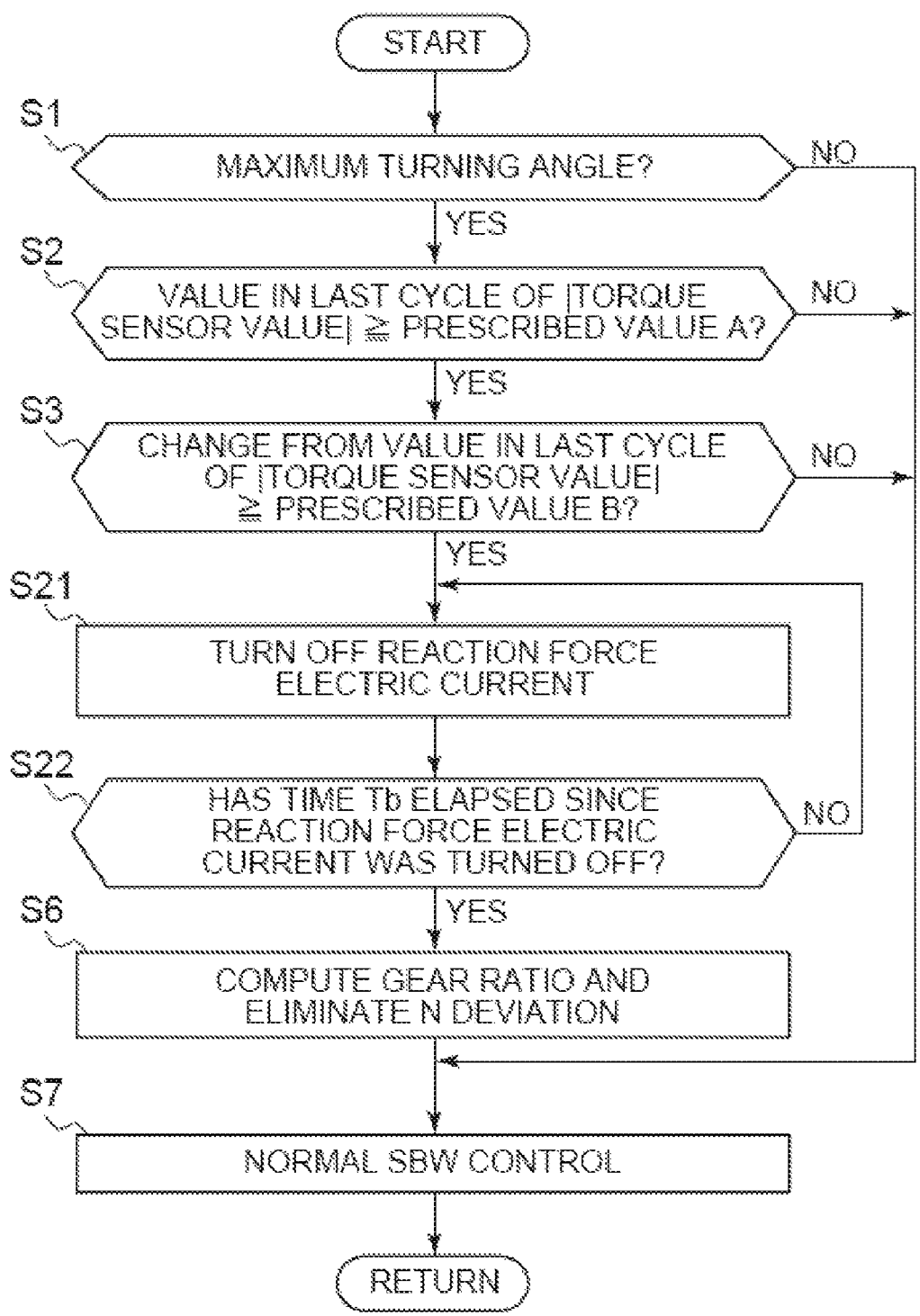
FIG. 8 is a flow chart showing the control processing for preventing erroneous clutch engagement executed by a reaction force controller in a third embodiment.

Since the hardware employed by the SBW system according to the third embodiment is substantially identical to that of the first embodiment as described in connection with FIG. 1, the description of the third embodiment is confined to explanation of the control processing for preventing erroneous clutch engagement executed by reaction force controller 10 as shown in FIG. 8. This process is performed for each control computing period (for example, every 5 ms). Also, the same step numbers are used for steps performing the same processing as described in connection with the first embodiment, and explanation of common steps is not repeated.

After steps S1, S2 and S3 evaluate as YES, flow proceeds to step S21. In step S21, the driving current of reaction force motor 4 is turned off (the instructed electric current value is set at 0), and flow proceeds to step S22. However, it should be understood that step S21 is not limited to turning off the current, but rather, any manner of changing the driving current of reaction force motor 4 to decrease the angular acceleration of the steering angle can be used. For example, the driving current of reaction force motor 4 may be reduced to near 0 in order to reduce the output torque of reaction force motor 4, and the angular acceleration of the steering angle is thus decreased. As another example, the driving current of reaction force motor 4 may be controlled such that braking is applied to the rotation of steering wheel 1 to stop rotation of steering wheel 1 after the driver lifts his/her hands from steering wheel 1.

In step S22 a judgment is made on whether steered wheels 9 have been turned back by checking whether a prescribed time Tb (for example, 50 ms) has elapsed from the time that the driving current was turned off. If step S22 evaluates as YES, flow proceeds to step S7. If step S22 evaluates as NO, flow proceeds to step S21. Here, instead of the passage of prescribed time Tb, whether steered wheels 9 have been turned back can also be judged by checking whether the reaction force motor angle has changed by a prescribed value (for example, 10 deg).

Thus, in the third embodiment, when the driver lifts his/her hands from steering wheel 1 after the steering reaction force becomes large while the steering angle is at its maximum, the driving current is turned off in step S22 until the prescribed time Tb elapses. Then the N deviation is corrected in step S6, and normal SBW control resumes in step S7.

Accordingly, by controlling reaction force motor 4 such that the steering angle acceleration is decreased, the relative angular acceleration between the steering angle and the turning angle becomes smaller. As a result, it is possible to prevent erroneous clutch engagement caused by an increase in the relative angular acceleration between the steering angle and the turning angle. In addition, because the steering angle acceleration is reduced in the third embodiment, it is possible to reduce the effect on the turning side, and variation in the behavior of the vehicle can be kept to a minimum.

Figure 9:
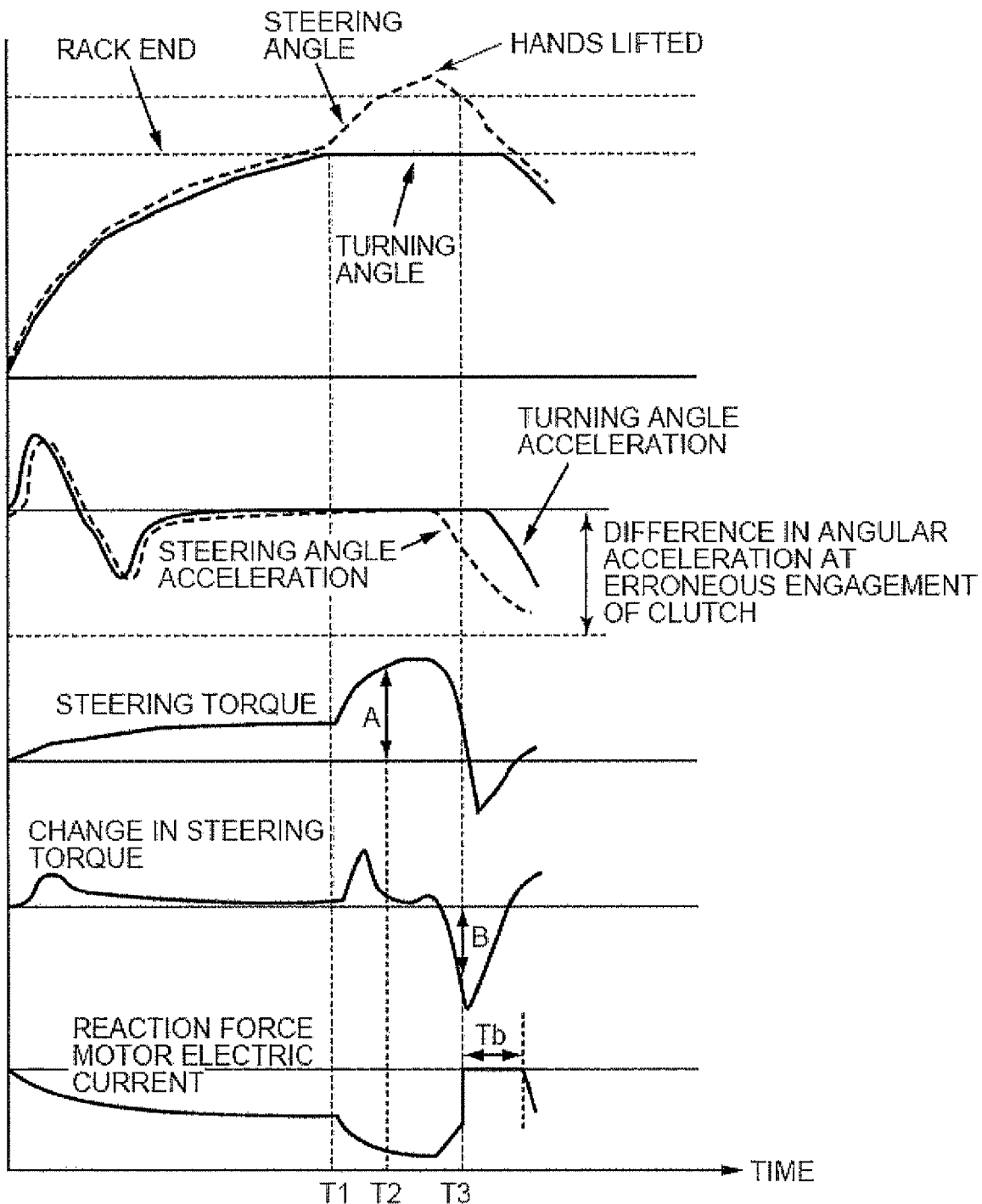
FIG. 9 is a time chart illustrating the operation for preventing erroneous clutch engagement in the third embodiment.

FIG. 9 is a time chart illustrating the operation for preventing erroneous clutch engagement in the SBW system of the third embodiment. At time T1 the turning angle reaches its maximum, and the torque value detected by torque sensor 3 becomes larger as the driver turns steering wheel 1 further. At time T2 the torque value detected by torque sensor 3 exceeds value A. Consequently, it is judged that the steering angle has increased subsequent to reaching the maximum turning angle. Because the change in the torque sensor exceeds prescribed value B at time T3, it is judged that the driver has lifted his/her hands from steering wheel 1, and the driving current of reaction force motor 4 is turned off. After reaction force motor 4 is turned off, the steering angle acceleration becomes smaller so that the relative angular acceleration between the steering angle and the turning angle decreases, and it is possible to prevent erroneous clutch engagement 5. Normal SBW control resumes after a prescribed time Tb has elapsed from time T3.

From the foregoing, it is seen that reaction force controller 10 in the third embodiment executes control for preventing erroneous clutch engagement by controlling reaction force motor 4 such that the angular acceleration of the steering angle is reduced. Consequently, while the effect on the behavior of the vehicle can be kept to a minimum, it is possible to prevent erroneous clutch engagement caused by an increase in the relative angular acceleration between the steering angle and the turning angle.

It should be recognized that the invention is not limited to the specific examples set forth in the above-described embodiments. Rather, numerous modifications within the scope of the invention could be made to the above embodiments. In particular, it is expressly contemplated that aspects of the first through third embodiments could be combined with one another. For example, aspects of the first embodiment could be combined with aspects of either the second or third embodiment to provide an SBW system wherein both the turning motor and the reaction force motor are controlled at the same time.

Accordingly, the above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A vehicle steering device, comprising:
   a steering wheel operable by a driver and having a steering wheel shaft connected thereto;
   a turning mechanism operable to turn at least one steered wheel;
   a turning actuator operable to apply torque to the turning mechanism;
   a reaction force actuator connected to the steering wheel to apply a steering reaction force thereto;
   a selectively engageable clutch positioned between the steering wheel and the turning mechanism and including a first rotary member mechanically connected to the turning mechanism, a second rotary member mechanically connected to the steering wheel shaft, and an engaging piece interposed between the first rotary member and the second rotary member, the clutch having an engaged position when the engaging piece is in wedging engagement between the first rotary member and the second rotary member wherein the steering wheel shaft is mechanically connected to the turning mechanism for turning the at least one steered wheel, and the clutch having a disengaged position when the engaging piece is in intermediate position between the first rotary member and the second rotary member wherein the steering wheel shaft is mechanically separated from the turning mechanism for steer-by-wire control of the at least one steered wheel; and a steering control part configured to control the turning actuator according to a steering angle of the steering wheel when the clutch is in the disengaged position such that a turning angle of the at least one steered wheel corresponds to the steering angle of the steering wheel and to simultaneously control the reaction force actuator to apply a steering reaction force to the steering wheel, the steering control part further configured to prevent the clutch from moving to the engaged position in response to a detection of an operating condition by controlling at least one of the turning actuator and the reaction force actuator to reduce a relative angular acceleration between the steering wheel and the turning mechanism.

2. The vehicle steering device according to claim 1 wherein the operating condition is detected when the steering reaction force is higher than a prescribed steering reaction force.

3. The vehicle steering device according to claim 1, further comprising:
a turning load detecting part configured to detect a turning load acting on the at least one steered wheel; and
wherein the operating condition is detected if the turning load exceeds a prescribed turning load.

4. The vehicle steering device according to claim 1 wherein the operating condition is detected if the steering reaction force exceeds a prescribed steering reaction force and if it is detected that the driver has lifted his hands from the steering wheel.

5. The vehicle steering device according to claim 4 wherein the steering control part is configured to control a turning torque of the turning actuator to reduce the turning angle to thereby reduce the relative angular acceleration between the steering wheel and the turning mechanism when the operating condition is detected.

6. The vehicle steering device according to claim 5 wherein the steering control part is configured to control the turning torque of the turning actuator by reducing the turning torque.

7. The vehicle steering device according to claim 5 wherein the steering control part is configured to control the turning torque of the turning actuator by setting the turning torque to 0.

8. The vehicle steering device according to claim 4 wherein the steering control part is configured to control the steering reaction force of the reaction force actuator to reduce an angular acceleration of the steering wheel to thereby reduce the relative angular acceleration between the steering wheel and the turning mechanism when the operating condition is detected.

9. A controller for a vehicle steering device for a vehicle including a steering wheel operable by a driver and having a steering wheel shaft connected thereto, a turning mechanism operable to turn at least one steered wheel, a turning actuator operable to apply torque to the turning mechanism, a reaction force actuator connected to the steering wheel to apply a steering reaction force thereto, and a selectively engageable clutch positioned between the steering wheel and the turning mechanism and including a first rotary member mechanically connected to the turning mechanism, a second rotary member mechanically connected to the steering wheel shaft, and an engaging piece interposed between the first rotary member and the second rotary member, the clutch having an engaged position when the engaging piece is in wedging engagement between the first rotary member and the second rotary member wherein the steering wheel shaft is mechanically connected to the turning mechanism for turning the at least one steered wheel, and the clutch having a disengaged position when the engaging piece is in intermediate position between the first rotary member and the second rotary member wherein the steering wheel shaft is mechanically separated from the turning mechanism for steer-by-wire control of the at least one steered wheel, the controller comprising:

means for controlling the turning actuator while the clutch is in the disengaged position such that a turning angle of the at least one steered wheel corresponds to a steering angle of the steering wheel and for simultaneously controlling the reaction force actuator such that a steering reaction force is applied to the steering wheel; and means for reducing a relative angular acceleration between the steering wheel and the turning mechanism when the steering reaction force is higher than a prescribed steering reaction force and while the clutch is in the disengaged position by controlling at least one of the turning actuator and the reaction force actuator.

10. A control method of a vehicle steering device for a vehicle including a steering wheel operable by a driver and having a steering wheel shaft connected thereto, a turning mechanism operable to turn at least one steered wheel, a turning actuator operable to apply torque to the turning mechanism, a reaction force actuator connected to the steering wheel to apply a steering reaction force thereto, and a selectively engageable clutch positioned between the steering wheel and the turning mechanism and including a first rotary member mechanically connected to the turning mechanism, a second rotary member mechanically connected to the steering wheel shaft, and an engaging piece interposed between the first rotary member and the second rotary member, the clutch having an engaged position when the engaging piece is in wedging engagement between the first rotary member and the second rotary member wherein the steering wheel shaft is mechanically connected to the turning mechanism for turning the at least one steered wheel, and the clutch having a disengaged position when the engaging piece is in intermediate position between the first rotary member and the second rotary member wherein the steering wheel shaft is mechanically separated from the turning mechanism for steer-by-wire control of the at least one steered wheel, the method comprising:

while the clutch is in the disengaged position, controlling the turning actuator such that a turning angle of the at least one steered wheel corresponds to a steering angle of the steering wheel and simultaneously controlling the reaction force actuator such that a steering reaction force is applied to the steering wheel; and while the clutch is in the disengaged position, reducing a relative angular acceleration between the steering wheel and the turning mechanism in response to detection of an operating condition by controlling at least one of the turning actuator and the reaction force actuator, the operating condition indicating a risk of erroneous engagement of the clutch.

11. The control method according to claim 10, further comprising:
detecting the operating condition when the steering reaction force is higher than a prescribed steering reaction force.

12. The control method according to claim 10, further comprising:

detecting a turning load acting on the at least one steered wheel; and detecting the operating condition when the turning load exceeds a prescribed turning load.

13. The control method according to claim 10, further comprising:

detecting the operating condition when the steering reaction force exceeds a prescribed steeling reaction force and when the driver has lifted his hands from the steering wheel.

14. The control method according to claim 10 wherein reducing the relative angular acceleration between the steering wheel and the turning mechanism comprises:

controlling a turning torque of the turning actuator to reduce the turning angle.

15. The control method according to claim 14 wherein controlling the turning torque comprises:

reducing the turning torque.

16. The control method according to claim 14 wherein controlling the turning torque comprises:

setting the turning torque to 0.

17. The control method according to claim 10 wherein reducing the relative angular acceleration between the steering wheel and the turning mechanism comprises:

controlling the steering reaction force to reduce an angular acceleration of the steering wheel.

18. The vehicle steering device according to claim 1 wherein the operating condition is a vehicle condition indicating a risk of erroneous engagement of the clutch.

* * * * *